(12) United States Patent
He et al.

(10) Patent No.: US 12,444,169 B2
(45) Date of Patent: Oct. 14, 2025

(54) WASSERSTEIN DISTANCE AND DIFFERENCE METRIC-COMBINED CHEST RADIOGRAPH ANOMALY IDENTIFICATION DOMAIN ADAPTATION METHOD AND SYSTEM

(71) Applicant: Hangzhou Dianzi University, Hangzhou (CN)

(72) Inventors: Bishi He, Hangzhou (CN); Zhe Xu, Hangzhou (CN); Yuanjiao Chen, Hangzhou (CN); Diao Wang, Hangzhou (CN); Hui Chen, Hangzhou (CN)

(73) Assignee: Hangzhou Dianzi University, Hangzhou (CN)

( * ) Notice: Subject to any disclaimer, the term of this patent is extended or adjusted under 35 U.S.C. 154(b) by 300 days.

(21) Appl. No.: 18/447,328

(22) Filed: Aug. 10, 2023

(65) Prior Publication Data
US 2024/0153243 A1     May 9, 2024

(30) Foreign Application Priority Data
Nov. 8, 2022 (CN) .......................... 202211393538.4

(51) Int. Cl.
*G06V 10/764* (2022.01)
*G06T 7/00* (2017.01)

(52) U.S. Cl.
CPC .......... *G06V 10/765* (2022.01); *G06T 7/0012* (2013.01); *G06T 2207/10081* (2013.01); *G06T 2207/20076* (2013.01); *G06T 2207/20081* (2013.01); *G06T 2207/30061* (2013.01); *G06V 2201/031* (2022.01)

(58) Field of Classification Search
CPC ............ G06V 10/765; G06V 2201/031; G06T 7/0012; G06T 2207/10081; G06T 2207/20076; G06T 2207/20081; G06T 2207/30061
USPC .......................................................... 382/128
See application file for complete search history.

(56) References Cited

U.S. PATENT DOCUMENTS

| | | | |
|---|---|---|---|
| 2021/0249142 A1* | 8/2021 | Lau ...................... | G16H 50/50 |
| 2023/0161978 A1* | 5/2023 | Sehanobish .............. | G06N 3/09 704/9 |
| 2023/0377320 A1* | 11/2023 | Wang ................... | G06V 10/811 |

* cited by examiner

*Primary Examiner* — Allen H Nguyen

(57) ABSTRACT

A Wasserstein distance and difference metric-combined chest radiograph anomaly identification domain adaptation method and a corresponding system are provided. The method includes the following steps: step 1, data preparation and data pre-processing for chest radiographs; step 2, multi-scale feature extraction based on a swin transformer network; step 3, loss minimization based on a Wasserstein distance and a contrastive domain discrepancy; and step 4, using the model to perform chest radiograph prediction after verifying the model. The method selects source domain samples closest to target domain samples, narrows a distance of the same class between the target domain samples and the source domain samples in feature space, and expands a distance between different classes. Meanwhile, a classification prediction task for the chest radiographs is performed by using the multi-scale features, improving a receptive field and capturing more information conducive to the classification prediction task.

10 Claims, 4 Drawing Sheets

WASSERSTEIN DISTANCE AND DIFFERENCE METRIC-COMBINED CHEST RADIOGRAPH ANOMALY IDENTIFICATION DOMAIN ADAPTATION METHOD AND SYSTEM

TECHNICAL FIELD

The disclosure relates to the field of deep learning and medical image processing technologies, particularly to a Wasserstein distance and difference metric-combined chest radiograph anomaly identification domain adaptation method and a Wasserstein distance and difference metric-combined chest radiograph anomaly identification domain adaptation system.

BACKGROUND

At present, machine learning is widely applied to various fields, but it is very difficult to collect large-scale data with complete annotation as a training set, and whether the collected training set and a test set have the same distribution or not is also considered. When there is a certain difference between the training set and the test set in data distribution or data features, a model trained on the training set results in a significant decrease in applying to the test set. Namely, a generalization ability of the trained model is poor and the trained model learns no useful knowledge from the training set to be applied to the test set.

For chest radiographs in the field of medical images, it is usually expensive and time-consuming to label the medical images, especially for a research on multiple central points, sample data of which may come from different machines of multiple hospitals. Furthermore, a scanning protocol, parameters and photographing angle of the radiographs, and test groups may also cause migration of the image distribution.

A literature [Pan S J, Qiang Y. A Survey on Transfer Learning [J]. IEEE Transactions on Knowledge and Data Engineering, 2010, 22(10): 1345-1359] discloses traditional domain transfer approaches, which divide the traditional domain transfer into transductive domain transfer, inductive domain transfer, and unsupervised domain transfer. However, the shallow domain transfer approaches herein generally depend on a traditional machine learning model, and in contrast, a deep domain adaptation approach with a convolutional neural network architecture generally integrates features learning and model training into an end-to-end learning model to perform the domain adaptation in a manner of facing a label space and a target prediction function.

Then, the end-to-end learning model is introduced into the domain adaptation based on an idea of confrontation, the training process of which is a game process between a feature extractor and a domain discriminator. Typical deep learning approaches include a domain adversarial neural network (DANN) and an adversarial discriminative domain adaptation (ADDA), but adversarial training processes of which cause feature extraction network of a target domain pays more attention on background regions, thereby resulting in an inability to correctly position. However, feature alignment is only made through a confusion domain discriminator, resulting in a large extraction feature error, and an improved conditional domain adversarial network (CDAN) appears later, which expands a conditional adversarial mechanism, improves its performance by defining the domain discriminator on the features, but bringing in a huge parameter quantity.

Therefore, it is of great significance to design a Wasserstein distance and difference metric-combined chest radiograph anomaly identification domain adaptation method and a corresponding system, which are capable of learning more useful knowledge in the training set (also referred to a source domain) to transfer to the test set (also referred to a target domain), can enable the parameter quantity to be smaller, and can improve chest radiograph image classification evaluation indicators.

The Wasserstein distance is also referred to as a bulldozer distance.

For example, X-ray chest radiograph bone suppression processing method based on wavelet decomposition and convolutional neural network disclosed in Chinese patent with patent application No. CN201710246611.8 (corresponding to the patent publication No. CN107038692A) adopts a convolutional neural network structure and uses a chest radiograph image wavelet coefficient as an input to predict a wavelet coefficient image of a bone image or a soft tissue image corresponding to the input. The input chest radiograph image is processed in a wavelet domain, amplitude normalization processing can be performed by using a simple method; the chest radiograph wavelet decomposition image can be directly used as the input, and then automatic learning is performed by training the convolutional neural network and a convolution kernel is optimized, a feature extraction process of the corresponding image is completed, which does not need to design an image feature extraction method. However, there is a deficiency existed in the above mentioned method, namely, the above-mentioned method still has limitations on the classification precision and the generalization ability of the chest radiographs.

SUMMARY

In order to overcome the problems that a conventional domain adaptation method in the related art cannot correctly position and extract feature errors and brings in a huge parameter quantity, the disclosure provides a Wasserstein distance and difference metric-combined chest radiograph anomaly identification domain adaptation method and a corresponding system, which can not only select source domain samples closest to target domain samples, but also narrow the distance of the same class between the target domain samples and the source domain samples in a feature space, expand the distance of the different classes there between, and simultaneously utilize the extracted multi-scale features to carry out a classification prediction task for chest radiographs, thereby effectively improving a receptive field, and capturing more information conducive to the classification prediction task for the chest radiographs.

In order to achieve the above objective, the disclosure provides a technical solution as follows.

A Wasserstein distance and difference metric-combined domain adaptation method is provided and includes the following steps:

step 1, data preparation and data pre-processing for chest radiographs:

obtaining computed tomography (CT) images of the chest radiographs and performing the data pre-processing on the CT images;

step 2, multi-scale feature extraction based on a swin transformer network:

inputting the CT images into a patch partition module to perform partitioning, setting 4×4=16 adjacent pixels as a patch, flattening the pixels in a channel direction, performing linear transformation on channel data of each of the pixels through a linear embedding layer, and then constructing feature maps with different sizes through four stages;

step 3, loss minimization based on a Wasserstein distance and a contrastive domain discrepancy:

selecting source domain samples closest to target domain samples and calculating the Wasserstein distance; performing cross-domain similar class approaching and dissimilar class splitting on the target domain samples to obtain the contrastive domain discrepancy; constructing a total objective function through the Wasserstein distance and the contrastive domain discrepancy; and performing optimization and parameter update on the swin transformer network based on the total objective function to obtain a model; and step 4, using the model to perform chest radiograph prediction after verifying the model:

verifying the optimized and updated swin transformer network and performing a classification prediction task for the chest radiographs.

In an embodiment, the data pre-processing in the step 1 includes standardization and data augmentation; the standardization includes: normalizing the CT images by using a mean value and a standard deviation of the CT images; and the data augmentation includes: performing the data augmentation on the CT images by using a manner of random rotation and horizontal flipping.

In an embodiment, the selecting source domain samples closest to target domain samples and calculating the Wasserstein distance in the step 3 includes the following steps:

step 31, defining a source domain data set as $D_S$, data samples in which obey a probability distribution of $D_S \sim X_S$; defining a target domain data set as $D_T$, data samples in which obey a probability distribution of $D_T \sim X_T$; and measuring a distribution difference between a source domain and a target domain by calculating the Wasserstein distance.

The Wasserstein distance is expressed in a formula (1) as follows:

$$W(X_S, X_T) = \inf_{\gamma \sim \Pi(X_S, X_T)} E_{(p,q) \sim \gamma}[\|p - q\|], \quad (1)$$

In the formula (1), $\Pi(X_S, X_T)$ represents a joint probability distribution set combined by a source domain distribution $X_S$ and a target domain distribution $X_T$, $\gamma \sim \Pi(X_S, X_T)$ represents a cost of transferring from the source domain distribution $X_S$ to the target domain distribution $X_T$ to make the source domain distribution $X_S$ and the target domain distribution $X_T$ obey a same distribution; for each joint probability distribution $\gamma$ of the joint probability distribution set $\Pi(X_S, X_T)$, samples p and q are obtained from a sampling $(p, q) \sim \gamma$ and a distance $\|p-q\|$ all between the sample p and the sample q is calculated, thereby an expected value $E_{(p,q) \sim \gamma}[\|p-q\|]$ of the sample p and the sample q relative to the distance $\|p-q\|$ under the corresponding joint probability distribution $\gamma$ is obtained; and as the expected value $E_{(p,q) \sim \gamma}[\|p-q\|]$ is smaller, the cost of transferring from the source domain distribution $X_S$ to the target domain distribution $X_T$ is smaller.

In an embodiment, the performing cross-domain similar class approaching and dissimilar class splitting on the target domain samples to obtain the contrastive domain discrepancy in the step 3 includes the following steps:

step 32, estimating a label hypothesis of the target domain samples by clustering, and introducing the contrastive domain discrepancy, i.e., a difference between a designated class c and a class c', during the clustering; minimizing a difference between same classes to compress a feature representation of intra-class samples, and maximizing a difference between different classes to further push a feature representation of inter-class samples away from a decision boundary.

The contrastive domain discrepancy is expressed in a formula (2) as follows:

$$D^{cdd} = \frac{1}{M}\sum_{c=0}^{M-1} D^{cc}(y_{1:n_t}^t, \varphi) - \frac{1}{M(M-1)}\sum_{c=0}^{M-1}\sum_{c'=1}^{M-1} D^{cc'}(y_{1:n_t}^t, \varphi), \quad (2)$$

In the formula (2), M represents five classes, $n_t$ represents a size of the target domain data set $D_T$, $y_{1:n_t}^t = \{y_1^t, y_2^t, \ldots, y_{n_t}^t\}$ represents a target domain class label set, $D^{cc'}$ represents an average embedding estimation between the designated class c and the class c' in a reproducing kernel hilbert space; minimizing the contrastive domain discrepancy $D^{cdd}$ to make the $$\frac{1}{M}\sum_{c=0}^{M-1} D^{cc}(y_{1:n_t}^t, \varphi)$$

in the formula (2) as small as possible and make the $$\frac{1}{M(M-1)}\sum_{c=0}^{M-1}\sum_{c'=1}^{M-1} D^{cc'}(y_{1:n_t}^t, \varphi)$$

in the formula (2) as large as possible, thereby for the five classes of the chest radiographs, a sample distribution of the same designated class c between the target domain and the source domain is narrowed and a sample distribution between the designated class c in the target domain and the class c' in the source domain is expanded; and φ represents a parameter of the swin transformer network.

In an embodiment, the constructing a total objective function through the Wasserstein distance and the contrastive domain discrepancy in the step 3 includes the following steps:

step 33, introducing the Wasserstein distance obtained in the step 31 and the contrastive domain discrepancy $D^{cdd}$ obtained in the step 32 as regularization terms of a loss function into a classification network to obtain the total objective function.

The total objective function is expressed in a formula (3) as follows:

$$\min_\theta l = l_c + \lambda W(X_S, X_T) + \beta D^{cdd}, \quad (3)$$

In the formula (3), $l_c$ represents a crossentropy loss obtained by training the source domain, λ and β represent weight parameters that balances losses of the Wasserstein distance and the contrastive domain discrepancy, respectively, and the parameter of the swin transformer network is adjusted until the total objective function converges by the losses of the Wasserstein distance and the contrastive domain discrepancy calculated by a loss formula.

In an embodiment, the performing optimization and parameter update on the swin transformer network based on the total objective function in the step 3 includes the following steps:

step 34, during a training iteration process, fixing the parameter φ of the swin transformer network, updating a sample clustering of the target domain, endowing each of the target domain samples with a target domain label corresponding to a cluster to which the target domain sample belongs after the sample clustering to obtain updated target domain labels corresponding to the target domain samples, calculating the contrastive domain discrepancy through the updated target domain labels, determining data samples participating in calculating the contrastive domain discrepancy by calculating the Wasserstein distance between the source domain samples and the target domain samples, and then updating the parameter of the swin transformer network by minimizing the contrastive domain discrepancy to complete iteration.

In an embodiment, the step 4 includes the following steps:

step 41, during the verifying, performing standardization on to-be-verified data; and step 42, calculating an area under curve (AUC), an accuracy, a sensitivity, a specificity, a positive prediction rate, and a negative prediction rate of each class of the chest radiographs for further verifying the model.

In an embodiment, the step 2 further includes the following steps:

setting an input size of each CT image to 224×224 to ensure that an output size of an output feature matrix after 32 times of sampling in the four stages of the swin transformer network is 7×7 corresponding to a size of a window in 7×7 in a fourth stage of the four stages; and selecting a Swin-T model in an architecture of the swin transformer network, where a number of layers of the Swin-T model is {2, 2, 6, 2}, and a channel depth of a hidden layer in a first stage of the four stages is 96.

The method further includes: inputting a target CT image of a patient chest radiograph into the model to obtain an anomaly identification result of the patient chest radiograph, thereby enabling a doctor to provide a diagnostic and treatment plan based on the anomaly identification result to a patient for a chest lesion treatment.

The disclosure further provides Wasserstein distance and difference metric-combined chest radiograph anomaly identification domain adaptation system, which includes the following modules:

a data preparation and pre-processing module, configured to obtain CT images of chest radiographs and perform data pre-processing on the CT images;

a feature extraction module, configured to input the CT images into a patch partition module to perform partitioning, set 4×4=16 adjacent pixels as a patch, flatten the pixels in a channel direction, perform linear transformation on channel data of each of the pixels through a linear embedding layer, and then construct feature maps with different sizes through four stages;

a loss minimization module, configured to select source domain samples closest to target domain samples and calculate a Wasserstein distance; perform cross-domain similar class approaching and dissimilar class splitting on the target domain samples to obtain a contrastive domain discrepancy; construct a total objective function through the Wasserstein distance and the contrastive domain discrepancy; and perform optimization and parameter update on a swin transformer network based on the total objective function; and a model verification module, configured to verify the swin transformer network after the optimization and the parameter update, and perform a classification prediction task of the chest radiographs.

Each of the data preparation and pre-processing module, the feature extraction module, the loss minimization module, and the model verification module is embodied by software stored in at least one memory and is executable by at least one processor.

Compared with the related art, the disclosure has the following beneficial effects: (1) the disclosure takes advantage of the swin transformer network to extract the deep feature representation of the data samples; on the basis of selecting the source domain samples closest to the target domain samples, the disclosure further realizes the cross-domain similar category approaching and dissimilar category splitting, improves a classification precision for the chest radiographs, and achieves the better generalization ability. (2) The disclosure further takes advantages of the contrastive domain discrepancy and the Wasserstein distance, thereby not only selecting the source domain samples closest to the target domain samples, but also narrowing the distance of the same classes between the target domain samples and the source domain samples in the feature space, and expanding the distance between the different classes of the target domain samples and the source domain samples in the feature space. (3) The method provided by the disclosure adopts the swin transformer network as the feature extractor, uses the multi-scale features extracted therefrom to perform the classification prediction task for the chest radiographs; and the hierarchy architecture of the swin transformer network can flexibly model in different scales, effectively improving the receptive field, and capturing more information conducive to the classification prediction task for the chest radiographs.

DETAILED DESCRIPTION OF EMBODIMENTS

In order to more clearly illustrate embodiments of the disclosure, the embodiments of the disclosure will be described below with reference to attached drawings. Apparently, the attached drawings in the following description are merely some of the embodiments of the disclosure, and for those skilled in the related art, other drawings can be obtained according to the attached drawings without creative efforts, thereby obtaining other embodiments.

EMBODIMENTS

Figure 1:
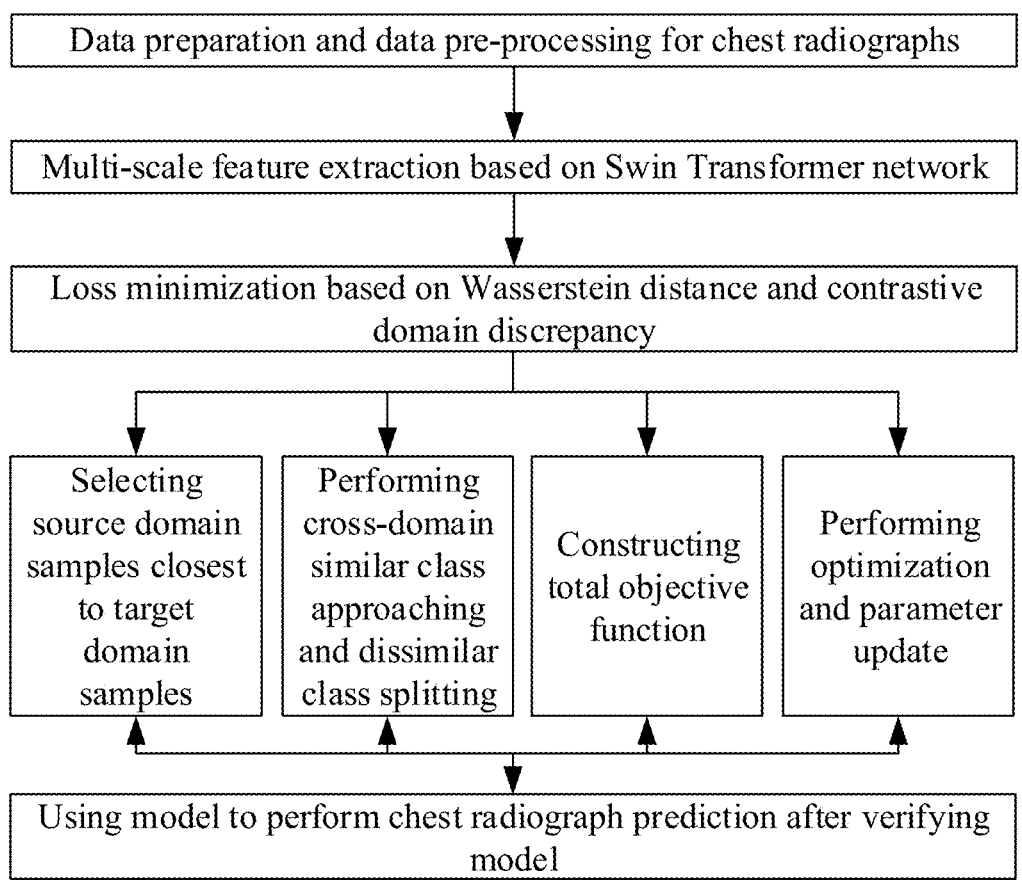
FIG. 1 illustrates a flowchart of a Wasserstein distance and difference metric-combined chest radiograph anomaly identification domain adaptation method according to an embodiment of the disclosure.

As shown in FIG. 1, the disclosure provides a Wasserstein distance and difference metric-combined chest radiograph anomaly identification domain adaptation method, including the following steps:

step 1, data preparation and data pre-processing for chest radiographs:

obtaining computed tomography (CT) images of the chest radiographs and performing the data pre-processing on the CT images;

step 2, multi-scale feature extraction based on a swin transformer network:

inputting the CT images into a patch partition module to perform partitioning, setting 4×4=16 adjacent pixels as a patch, flattening the pixels in a channel direction, performing linear transformation on channel data of each of the pixels through a linear embedding layer, and then constructing feature maps with different sizes through four stages;

step 3, loss minimization based on a Wasserstein distance and a contrastive domain discrepancy:

selecting source domain samples closest to target domain samples and calculating the Wasserstein distance; performing cross-domain similar class approaching and dissimilar class splitting on the target domain samples to obtain the contrastive domain discrepancy; constructing a total objective function through the Wasserstein distance and the contrastive domain discrepancy; and performing optimization and parameter update on the swin transformer network based on the total objective function to obtain a model; and step 4, using the model to perform chest radiograph prediction after verifying the model:

verifying the optimized and updated swin transformer network and performing a classification prediction task for the chest radiographs.

An illustrated implementation of the step 1 is as follows.

Step 1, data preparation and data pre-processing for chest radiographs.

Information of a chest radiograph data set used in the embodiment is as follows: the source domain is a CheXpert (i.e., chest expert) data set (also referred to a large public dataset for chest radiograph interpretation), including 224,316 chest radiographs of 65,240 patients with frontal, lateral, and side views. It should be noted that most of the chest radiographs are taken from the frontal and lateral views, and the CheXpert data set has uncertain medical labels and radiologist-labeled reference annotation evaluation set, which can be used for predicting a probability of 14 different observation results from the multi-view chest radiographs. The target domain is a Chest X-Ray 14 data set, including 112,120 frontal-view X-ray images (also referred to chest radiographs) of 30,805 patients, whose radiological reports contain 14 common disease labels. Each of the CheXpert data set and the Chest X-Ray 14 data set is randomly divided into a training set, a test set, and a verification set according to a ratio of 8:1:1, which is shown in Table 1 below, and a batch size is set to 32.

Table 1 illustrates a data division table as follows:

| Data set | Training set | Test set | Verification set |
| --- | --- | --- | --- |
| CheXpert | 179,452 | 22,432 | 22,432 |
| Chest X-Ray14 | 89,696 | 11,212 | 11,212 |

In the method of the disclosure, in view of a common class set between the source domain and the target domain, five classes of diseases within the CheXpert data set and the Chest X-Ray14 data set are selected, which are respectively: atelectasis, cardiomegaly, pleural effusion, consolidation, and edema.

The data pre-processing in the step 1 includes two parts: standardization and data augmentation. The standardization is carried out by normalizing the CT images by using a mean value and a standard deviation of the CT images, thereby making image data distribution meets a standard normal distribution, and then, scaling the CT images uniformly in a size of (32, 3, 224, 224). The data augmentation includes horizontal flipping and random rotation with −25 degrees to +25 degrees.

An illustrated implementation of the step 2 is as follows.

Step 2, multi-scale feature extraction based on a swin transformer network.

Figure 2:
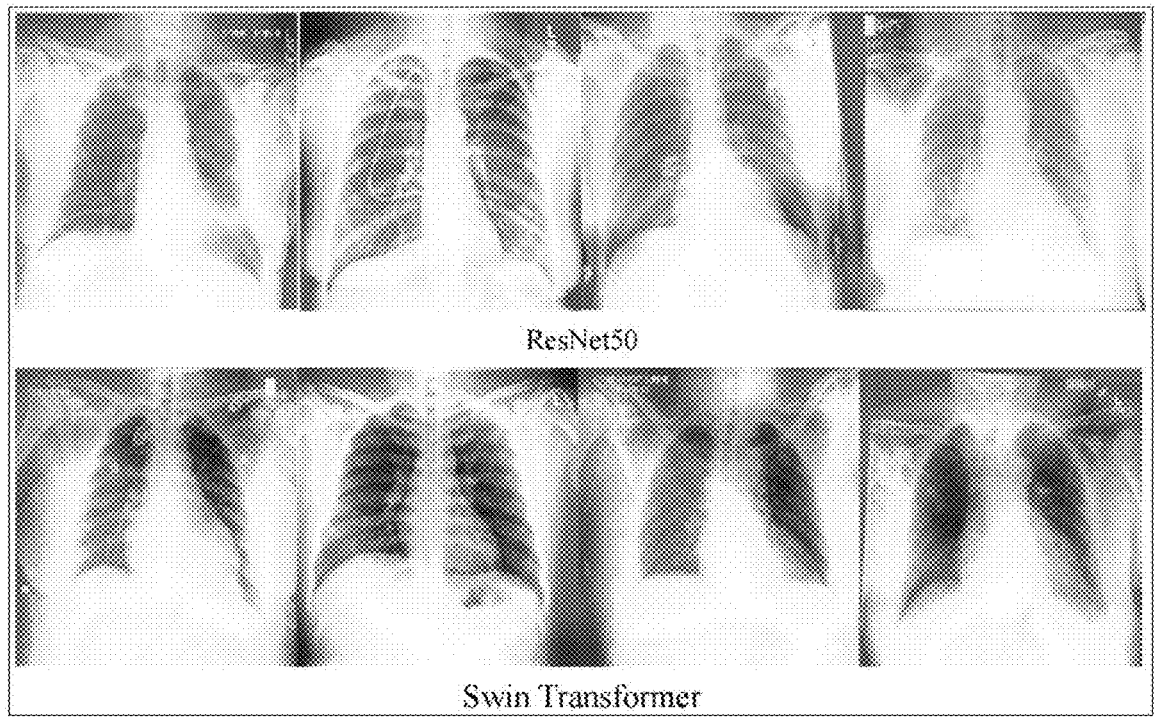
FIG. 2 illustrates a schematic diagram of thermodynamic performance comparison generated by a convolutional neural network and a swin transformer network on chest radiographs according to an embodiment of the disclosure.

The swin transformer network is selected as the multi-scale feature extractor, and a comparison of thermodynamic performance diagrams generated by a convolutional neural network (i.e., a ResNet50) and the swin transformer network is illustrated in FIG. 2. The deeper the color in the thermodynamic performance diagram represents that the model pays more attention on the information of the region with the deeper color, and the greater the influence of the region on the final classification task is. It can be seen from FIG. 2 that compared with the convolutional neural network, the attention degree of a region of interest where the swin transformer network generates a lesion on the chest radiographs is higher, and therefore, the model can pay more attention to feature information beneficial to the classification task.

An input size of each chest radiograph is a three-channel image, a height H and a width W of the image are 224*224, respectively, and then the image is input into the patch partition module for partitioning; each patch has 16 pixels, each pixel has three values of red (R), green (G), and blue (B), and a shape of the image after flattening in the channel direction changes into (32, 48, 56, 56) from (32, 3, 224, 224).

And then, the feature maps with different sizes are constructed through the four stages and the swin transformer (Swin-T) block is stacked repeatedly. For a Swin-T model in an architecture of the swin transformer network, the times of blocks stacked in the four stages are (2, 2, 6, 2), and a size of window used in each stage is 7×7. In an illustrated embodiment, in a first stage, the channel data of each pixel is linearly transformed by the linear embedding layer, the features are embedded into 96 dimensions, the shape of the image is changed from (32, 48, 56, 56) to (32, 96, 56, 56), and the following second, third, and fourth stages are sampled twice on the basis of the output of a corresponding previous stage, and the shape change process of the image is from (32, 96, 56, 56) to (32, 192, 28, 28) to (32, 384, 14, 14) to (32, 768, 7, 7), thereafter generating a multi-level feature map. Structure configuration information of the four stages of the Swin-T is shown in Table 2 below.

Table 2 illustrates the structure configuration information of the four stages of the Swim-T model as follows:

|  | Stage 1 | Stage 2 | Stage 3 | Stage 4 |
|---|---|---|---|---|
| Channel depth of feature map | 96 | 192 | 384 | 768 |
| Number of heads in self-attention module | 3 | 6 | 12 | 24 |
| Number of stacked blocks | 2 | 2 | 6 | 2 |

The above-mentioned stacked Swin-T block includes two structures, such as a windows multi-head self-attention module (W-MSA module), the introduction of which can reduce a calculation amount of the self-attention operation, and the calculation amount of the feature map is as shown in the following formula (1): $A=4HWC^2+2M^2HWC$, (1), where A represents the calculated amount, H represents the height of the feature map, W represents the width of the feature map, C represents the depth of the feature map, and M represents the width of the window.

And another one is a shifted windows multi-head self-attention module (SW-MSA module), and the module enables information communication between different windows by using an offset window. The two self-attention structures are connected in series to form a block.

For the chest radiograph classification task, after passing through the swin transformer network, a layer norm, a global pooling layer, and a full connected layer are further connected after the swin transformer network, thereafter obtaining a final output.

An illustrated implementation of the step 3 is as follows.

Step 3, loss minimization based on a Wasserstein distance and a contrastive domain discrepancy.

Feature vectors of the source domain and the target domain are obtained from the output of the full connected layer, and the Wasserstein distance between the source domain and the target domain is calculated. One advantage of the Wasserstein distance compared to kullback-leibler (KL) divergence and jensen-shannon (JS) divergence is that even if the sample distribution of the source domain is less overlapped in that of the target domain, the distance between the two domains can also be reflected. Furthermore, when there is no overlapping portion or the overlapping portion can be neglected between the two distributions, the KL divergence may be meaningless, the JS divergence is constant, which means that the gradient is 0 for the gradient-decreased method and the Wasserstein distance is smooth, which can provide a more stable gradient.

Due to that an infimum is difficult to obtain a result, the Wasserstein distance can be written as a dual form based on kantorovich-rubenstein duality, as shown in the following formula (2):

$$W(X_S, X_T) = \sup_{\|g\|_L \leq 1} E_{D_S \sim X_S}[g(D_S)][-E_{D_T \sim X_T}[g(D_T)]], \quad (2)$$

where sup represents an supremum, $E_{D_S \sim X_S}[g(D_S)]$ and $E_{D_T \sim X_T}[g(D_T)]$ represent an expected value of the source domain samples $D_S$ (i.e., the samples within the source domain data set) and the target domain samples $D_T$ (i.e., the samples within the target domain data set) relative to a function g(x) under edge probability distributions $X_S$ and $X_T$, respectively, $\|g\|_L$ represents a lipschitz function, which is defined as shown in the following formula (3):

$$\|g\|_L = \sup |g(x_1)-g(x_2)|/|x_1-x_2|, \quad (3).$$

The source domain samples closest to the target domain samples are selected by minimizing the loss of the Wasserstein distance, and then the contrastive domain discrepancy is used to execute class-aware alignment for the domain adaptation, and the inter-class difference and the intra-class difference are jointly optimized to improve performance of the domain adaptation.

Since the contrastive domain discrepancy is a maximum mean difference after adding class conditions, and the maximum mean difference is determined by the average embedding in the reproducing kernel hilbert space distribution. Therefore, when the data quantity is large, sufficient statistical calculation is less likely to be affected by the label noise.

In the training process, in addition to minimizing the crossentropy loss on the labeled source domain samples, the domain adaptation network further estimates an underlying label hypothesis of the target domain samples through clustering, and after the clustering, when the contrastive domain discrepancy is estimated, fuzzy target domain data far away from the clustering center and fuzzy classes containing few target domain samples around the clustering center are zeroed. Furthermore, as the training is carried out, more and more classes are also included, and the swin transformer network becomes more and more accurate. In the iteration process, the source domain and the target domain are subjected to class-aware sampling, that is, each class in a class subset of the random sampling is sampled from the two domains, thereby improving the training efficiency.

The Wasserstein distance and the contrastive domain discrepancy $D^{cdd}$ are introduced as regularization terms of a loss function into a classification network to obtain the total objective function as shown in the following formula (4):

$$\min_\theta l = l_c + \lambda W(X_S, X_T) + \beta D^{cdd}, , \quad (4)$$

where $l_c$ represents a crossentropy loss obtained by training the source domain, and $\lambda$ and $\beta$ represent weight parameters that balances losses of the Wasserstein distance and the contrastive domain discrepancy, respectively.

The feature representation is adjusted by a back propagation, thereafter performing optimization on the swin transformer network; and in the above mentioned process, an epoch is set as 50, a learning rate is set as 0.0001, a momentum is set as 0.9, and a decay rate is set as 0.0001. Furthermore, whether the current trained model is the optimal model is determined according to the AUC values of the trained model on the verification set for each epoch calculation model and the performance of the verification set.

An illustrated implementation of the step 4 is as follows.

Step 4, using the model to perform chest radiograph prediction after verifying the model.

In the verifying mode, the parameter of the optimal model obtained by training in the foregoing steps are loaded, and after the chest radiographs to be tested are subjected to the standardization, the classification prediction task is performed. The predicted labels are used to calculate four quadrants in a confusion matrix, such as true positive (TP), true negative (TN), false positive (FP), false negative (FN), and the corresponding AUC values, thereby evaluating the classification effect of the trained model. AUC is the area under a receiver operator characteristic (ROC) curve, an abscissa of the ROC curve is a false positive rate (FPR), and a calculation formula for the FPR is as shown in the following formula (5):

$$FPR = \frac{FP}{FP+TN}, \quad (5)$$

An ordinate of the ROC curve is a true positive rate (TPR), and a calculation formula for the TPR is as shown in the following formula (6):

$$TPR = \frac{TP}{TP+FN}, \quad (6)$$

Figure 3A:
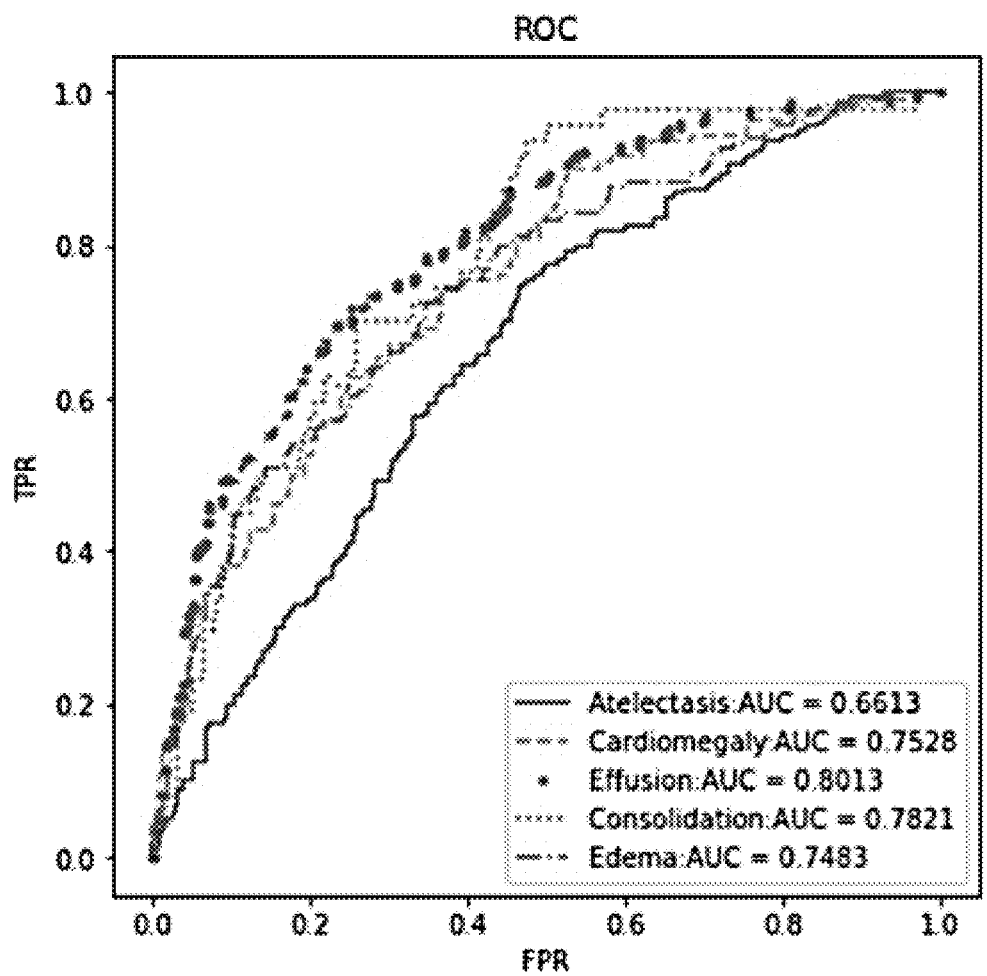
FIG. 3A illustrates a schematic diagram of a chest radiograph anomaly identification model based on ResNet50 in area under curve (AUC) evaluation.
Figure 3B:
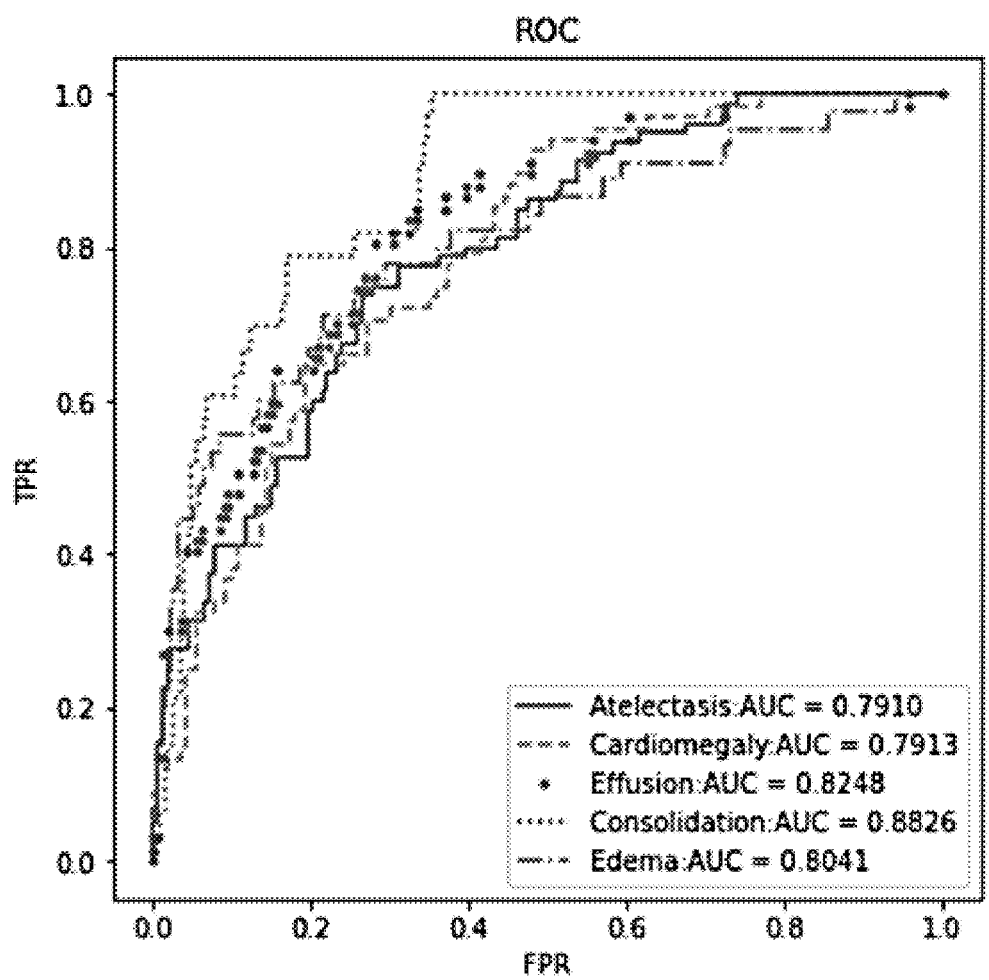
FIG. 3B illustrates a schematic diagram of a chest radiograph anomaly identification model trained by the method according to the embodiment of the disclosure in the AUC evaluation.

The AUC value is closer to 1, the classification performance of the model is better. After verification, the traditional domain adaptation method using the convolutional neural network (i.e., the ResNet50) as the chest radiograph anomaly identification model has the average AUC value of the five types of lesions of 0.7492. However, the average AUC value predicted by the domain adaptation model trained by the method provided by the disclosure in the target domain is 0.8188. Therefore, compared with the traditional model, the performance of the disclosure is improved by 9.3%. Model verification results are shown in FIGS. 3A-3B, and it can be seen that the prediction performance and the generalization performance of the trained model provided by the disclosure are more excellent compared with only using the ResNet50 as the chest radiograph anomaly identification model.

The disclosure also provides a Wasserstein distance and difference metric-combined chest radiograph anomaly identification domain adaptation system, including:

a data preparation and pre-processing module, configured to obtain CT images of chest radiographs and perform data pre-processing on the CT images;

a feature extraction module, configured to input the CT images into a patch partition module to perform partitioning, set 4×4=16 adjacent pixels as a patch, flatten the pixels in a channel direction, perform linear transformation on channel data of each of the pixels through a linear embedding layer, and then construct feature maps with different sizes through four stages;

a loss minimization module, configured to select source domain samples closest to target domain samples and calculate a Wasserstein distance; perform cross-domain similar class approaching and dissimilar class splitting on the target domain samples to obtain a contrastive domain discrepancy; construct a total objective function through the Wasserstein distance and the contrastive domain discrepancy; and perform optimization and parameter update on a swin transformer network based on the total objective function; and a model verification module, configured to verify the swin transformer network after the optimization and the parameter update, and perform a classification prediction task of the chest radiographs.

Each of the data preparation and pre-processing module, the feature extraction module, the loss minimization module, and the model verification module is embodied by software stored in at least one memory and is executable by at least one processor.

The disclosure takes advantage of the swin transformer network to extract a deep feature representation of the data samples. On the basis of selecting the source domain samples closest to the target domain samples, the disclosure further realizes the cross-domain similar category approaching and dissimilar category splitting, improves a classification precision of the chest radiographs, and achieves the better generalization ability. The disclosure further takes advantages of the contrastive domain discrepancy and the Wasserstein distance, thereby not only selecting the source domain samples closest to the target domain samples, but also narrowing the distance of the same class between the target domain samples and the source domain samples in the feature space, and expanding the distance of the different class there between. The method provided by the disclosure adopts the swin transformer network as the feature extractor, using the multi-scale features extracted therefrom to perform the classification prediction task for the chest radiographs. In addition, the hierarchy architecture of the swin transformer network can flexibly model in different scales, effectively improving the receptive field, and capturing more information conducive to the classification prediction task for the chest radiographs.

The above only provides a detailed explanation of the illustrated embodiments and basic principles of the disclosure. For those skilled in the related art, there may be changes in the illustrated embodiments based on the ideas provided by the disclosure, and the changes should also be considered as the scope of the protection of the disclosure.

What is claimed is:

1. A Wasserstein distance and difference metric-combined chest radiograph anomaly identification domain adaptation method, comprising the following steps:

step 1, data preparation and data pre-processing for chest radiographs:

obtaining computed tomography (CT) images of the chest radiographs and performing the data pre-processing on the CT images;

step 2, multi-scale feature extraction based on a swin transformer network:

inputting the CT images into a patch partition module to perform partitioning, setting 4×4=16 adjacent pixels as a patch, flattening the pixels in a channel direction, performing linear transformation on channel data of each of the pixels through a linear embedding layer, and then constructing feature maps with different sizes through four stages;

step 3, loss minimization based on a Wasserstein distance and a contrastive domain discrepancy:

selecting source domain samples closest to target domain samples and calculating the Wasserstein distance; performing cross-domain similar class approaching and dissimilar class splitting on the target domain samples to obtain the contrastive domain discrepancy; constructing a total objective function through the Wasserstein distance and the contrastive domain discrepancy; and performing optimization and parameter update on the swin transformer network based on the total objective function to obtain a model; and step 4, using the model to perform chest radiograph prediction after verifying the model:

verifying the optimized and updated swin transformer network and performing a classification prediction task for the chest radiographs.

2. The method as claimed in claim 1, wherein the data pre-processing in the step 1 comprises standardization and data augmentation; the standardization comprises: normalizing the CT images by using a mean value and a standard deviation of the CT images; and the data augmentation comprises: performing the data augmentation on the CT images by using a manner of random rotation and horizontal flipping.

3. The method as claimed in claim 1, wherein the selecting source domain samples closest to target domain samples and calculating the Wasserstein distance in the step 3 comprises the following steps:

step 31, defining a source domain data set as $D_S$, wherein data samples in the source domain data set $D_S$ obey a probability distribution of $D_S \sim X_S$; defining a target domain data set as $D_T$, wherein data samples in the target domain data set $D_T$ obey a probability distribution of $D_T \sim X_T$; and measuring a distribution difference between a source domain and a target domain by calculating the Wasserstein distance;

wherein the Wasserstein distance is expressed in a formula (1) as follows:

$$W(X_S, X_T) = \inf_{\gamma \sim \Pi(X_S, X_T)} E_{(p,q) \sim \gamma}[\|p - q\|], \; ; \quad (1)$$

wherein $\Pi(X_S, X_T)$ represents a joint probability distribution set combined by a source domain distribution $X_S$ and a target domain distribution $X_T$, $\gamma \sim \Pi(X_S, X_T)$ represents a cost of transferring from the source domain distribution $X_S$ to the target domain distribution $X_T$ to make the source domain distribution $X_S$ and the target domain distribution $X_T$ obey a same distribution; wherein for each joint probability distribution $\gamma$ of the joint probability distribution set $\Pi(X_S, X_T)$, samples p and q are obtained from a sampling $(p, q) \sim \gamma$ and a distance $\|p-q\|$ between the sample p and the sample q is calculated, thereby an expected value $E_{(p,q) \sim \gamma}[\|p-q\|]$ of the sample p and the sample q relative to the distance $\|p-q\|$ under the corresponding joint probability distribution $\gamma$ is obtained; and as the expected value $E_{(p,q) \sim \gamma}[\|p-q\|]$ is smaller, the cost of transferring from the source domain distribution $X_S$ to the target domain distribution $X_T$ is smaller.

4. The method as claimed in claim 3, wherein the performing cross-domain similar class approaching and dissimilar class splitting on the target domain samples to obtain the contrastive domain discrepancy in the step 3 comprises the following steps:

step 32, estimating a label hypothesis of the target domain samples by clustering, and introducing the contrastive domain discrepancy, i.e., a difference between a designated class c and a class c', during the clustering; minimizing a difference between same classes to compress a feature representation of intra-class samples, and maximizing a difference between different classes to further push a feature representation of inter-class samples away from a decision boundary;

wherein the contrastive domain discrepancy is expressed in a formula (2) as follows:

$$D^{cdd} = \frac{1}{M}\sum_{c=0}^{M-1} D^{cc}(y^t_{1:n_t}, \varphi) - \frac{1}{M(M-1)}\sum_{c=0}^{M-1}\sum_{c'=1}^{M-1} D^{cc'}(y^t_{1:n_t}, \varphi), \; ; \quad (2)$$

wherein M represents five classes, $n_t$ represents a size of the target domain data set $D_T$, $y^t_{1:n_t} = \{y_1^t, y_2^t, \ldots, y_{n_t}^t\}$ represents a target domain class label set, $D^{cc'}$ represents an average embedding estimation between the designated class c and the class c' in a reproducing kernel hilbert space; minimizing the contrastive domain discrepancy $D^{cdd}$ to make the $$\frac{1}{M}\sum_{c=0}^{M-1} D^{cc}(y^t_{1:n_t}, \varphi)$$

in the formula (2) as small as possible and make the $$\frac{1}{M(M-1)}\sum_{c=0}^{M-1}\sum_{c'=1}^{M-1} D^{cc'}(y^t_{1:n_t}, \varphi)$$

in the formula (2) as large as possible, thereby for the five classes of the chest radiographs, a sample distribution of the same designated class c between the target domain and the source domain is narrowed and a sample distribution between the designated class c in the target domain and the class c' in the source domain is expanded; and $\varphi$ represents a parameter of the swin transformer network.

5. The method as claimed in claim 4, wherein the constructing a total objective function through the Wasserstein distance and the contrastive domain discrepancy in the step 3 comprises the following steps:

step 33, introducing the Wasserstein distance obtained in the step 31 and the contrastive domain discrepancy $D^{cdd}$ obtained in the step 32 as regularization terms of a loss function into a classification network to obtain the total objective function;

wherein the total objective function is expressed in a formula (3) as follows:

$$\min_\theta l = l_c + \lambda W(X_S, X_T) + \beta D^{cdd}, \; ; \quad (3)$$

wherein $l_c$ represents a crossentropy loss obtained by training the source domain, $\lambda$ and $\beta$ represent weight parameters that balances losses of the Wasserstein distance and the contrastive domain discrepancy, respectively, and the parameter of the swin transformer network is adjusted until the total objective function converges by the losses of the Wasserstein distance and the contrastive domain discrepancy calculated by a loss formula.

6. The method as claimed in claim 5, wherein the performing optimization and parameter update on the swin transformer network based on the total objective function in the step 3 comprises the following steps:

step 34, during a training iteration process, fixing the parameter $\varphi$ of the swin transformer network, updating a sample clustering of the target domain, endowing each of the target domain samples with a target domain label corresponding to a cluster to which the target domain sample belongs after the sample clustering to obtain updated target domain labels corresponding to the target domain samples, calculating the contrastive domain discrepancy through the updated target domain labels, determining data samples participating in calculating the contrastive domain discrepancy by calculating the Wasserstein distance between the source domain samples and the target domain samples, and then updating the parameter of the swin transformer network by minimizing the contrastive domain discrepancy to complete iteration.

7. The method as claimed in claim 1, wherein the step 4 comprises the following steps:
step 41, during the verifying, performing standardization on to-be-verified data; and
step 42, calculating an area under curve (AUC), an accuracy, a sensitivity, a specificity, a positive prediction rate, and a negative prediction rate of each class of the chest radiographs for further verifying the model.

8. The method as claimed in claim 1, wherein the step 2 further comprises the following steps:
setting an input size of each CT image to 224×224 to ensure that an output size of an output feature matrix after 32 times of sampling in the four stages of the swin transformer network is 7×7 corresponding to a size of a window in 7×7 in a fourth stage of the four stages; and
selecting a Swin-T model in an architecture of the swin transformer network, wherein a number of layers of the Swin-T model is {2, 2, 6, 2}, and a channel depth of a hidden layer in a first stage of the four stages is 96.

9. The method as claimed in claim 1, wherein the method further comprises:
inputting a target CT image of a patient chest radiograph into the model to obtain an anomaly identification result of the patient chest radiograph, thereby enabling a doctor to provide a diagnostic and treatment plan based on the anomaly identification result to a patient for a chest lesion treatment.

10. A Wasserstein distance and difference metric-combined chest radiograph anomaly identification domain adaptation system, comprising:
a data preparation and pre-processing module, configured to obtain CT images of chest radiographs and perform data pre-processing on the CT images;
a feature extraction module, configured to input the CT images into a patch partition module to perform partitioning, set 4×4=16 adjacent pixels as a patch, flatten the pixels in a channel direction, perform linear transformation on channel data of each of the pixels through a linear embedding layer, and then construct feature maps with different sizes through four stages;
a loss minimization module, configured to select source domain samples closest to target domain samples and calculate a Wasserstein distance; perform cross-domain similar class approaching and dissimilar class splitting on the target domain samples to obtain a contrastive domain discrepancy; construct a total objective function through the Wasserstein distance and the contrastive domain discrepancy; and perform optimization and parameter update on a swin transformer network based on the total objective function; and
a model verification module, configured to verify the swin transformer network after the optimization and the parameter update, and perform a classification prediction task of the chest radiographs.

* * * * *